June 29, 1965 G. F. METZ 3,192,478
BIDIRECTIONAL COUNTER ADAPTED FOR RECEIVING
PLURAL SIMULTANEOUS INPUT SIGNALS
Filed Oct. 26, 1962 2 Sheets-Sheet 2

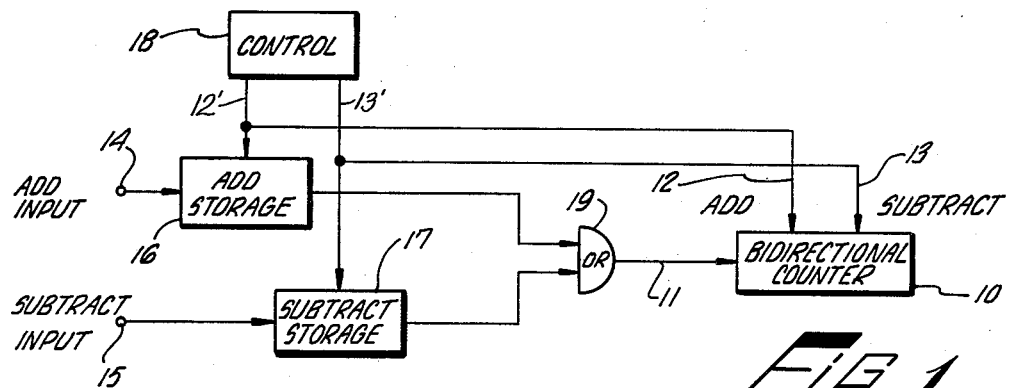
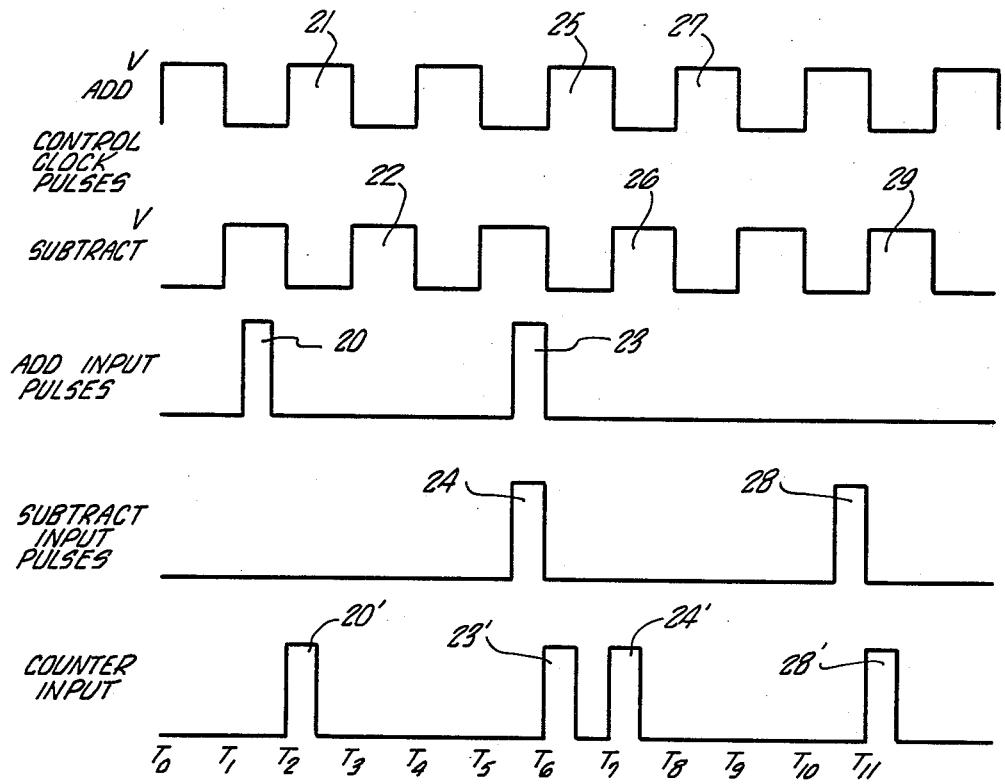

INVENTOR.
GEORGE F. METZ
BY
ATTORNEY 3,192,478
BIDIRECTIONAL COUNTER ADAPTED FOR RECEIVING PLURAL SIMULTANEOUS INPUT SIGNALS
George F. Metz, Goffstown, N.H., assignor to Beckman Instruments, Inc., a corporation of California
Filed Oct. 26, 1962, Ser. No. 233,369
14 Claims. (Cl. 328—44)

The present invention relates generally to counter systems and, more particularly, to an electrical counter adapted to receive and accurately count plural simultaneous input signals.

In the present state of the art, there are many uses for electronic digital counters. Such counters, for example, can be used for any application in which a suitable transducer produces voltage changes which represent the occurrence of physical events. Examples of laboratory and industrial applications include precision tachometry; measurement of pressure, flow, temperature, velocity, viscosity, and frequency; process control; data reduction systems; calibration of frequency generating equipment; and measurement of practically any electrical, mechanical, optical or other physical event.

Frequently, it is desirable or necessary to add or subtract input signals generated by more than one source. By way of specific example, this type of situation occurs in a manufacturing plant having two conveyor lines in which it is desirable to add the total number of pieces being carried by both lines. Or, as another example, the manufacturing procedure may dictate that the number of devices flowing at two points on the same conveyor line be compared by subtracting one from the other. This information may then be used to prevent the number of pieces entering a conveyor line from exceeding those exiting by more than a preset number. Still another field of application is comparing the output of an untested oscillator with a standard oscillator and determining the deviation of the oscillator under test with the standard by subtracting their respective outputs.

In each of the applications described above and in most instances of counting pulses from two sources of random pulses, the likelihood exists that signals will be generated from time to time by one source simultaneously with signals generated from another source. Representative counters in the prior art lose one or more of the input signals under these conditions thereby introducing an error into the counter output.

Accordingly, it is an object of the present invention to provide a counter for receiving input signals from plural sources and accurately counting all of the signals received including those which occur coincident or near coincident with another input signal.

Another object of this invention is to provide apparatus for adapting a bidirectional counter to simultaneously accept two inputs representing opposite algebraic signs.

Still another object of this invention is to provide a dual-purpose counter which may either selectively add or subtract simultaneously occurring input signals.

Other and further objects, features and advantages of the invention will become apparent as the description proceeds.

Briefly, in accordance with a preferred form of the present invention, the counter input signals received from plural sources are initially stored and subsequently transferred to the input of a digital counter when that counter is in the appropriate counting mode. For example, a bidirectional counter adapted to receive simultaneous input pulses from first and second sources representing opposite algebraic signs comprises a control means for alternately switching the bidirectional counter into its ADD and SUBTRACT counting modes. First and second storage means respectively connected to ADD and SUBTRACT input terminals store pulses received at these terminals. These storage means are subsequently sampled and cleared by the control means during the appropriate counting mode, i.e. the ADD storage means is sampled and cleared when the counter has been set to count in a forward direction (ADD mode) whereas the SUBTRACT storage means is sampled and cleared when the counter is set to count in a reverse direction (SUBTRACT mode). Any pulse stored in the storage means is then transferred to the input of the counter independently of the other storage means so that the counter correctly counts each input pulse regardless of whether it coincides in time with a pulse representing the opposite algebraic sign.

Another embodiment of the invention disclosed hereinafter selectively adds or subtracts simultaneous input signals. Thus, pulses introduced at first and second input terminals are either added together or one is subtracted from the other according to the operator's selection.

A more thorough understanding of the invention may be obtained by study of the following detailed description taken in connection with the accompanying drawings in which:

FIG. 1 is a simplified block diagram showing the principles of operation of a bidirectional counter adapted to accept simultaneous ADD and SUBTRACT input signals constructed in accordance with this invention;

FIG. 2 illustrates representative control pulses, ADD and SUBTRACT input pulses, and counter input pulses provided by counters constructed in accordance with this invention.

Figure 3:
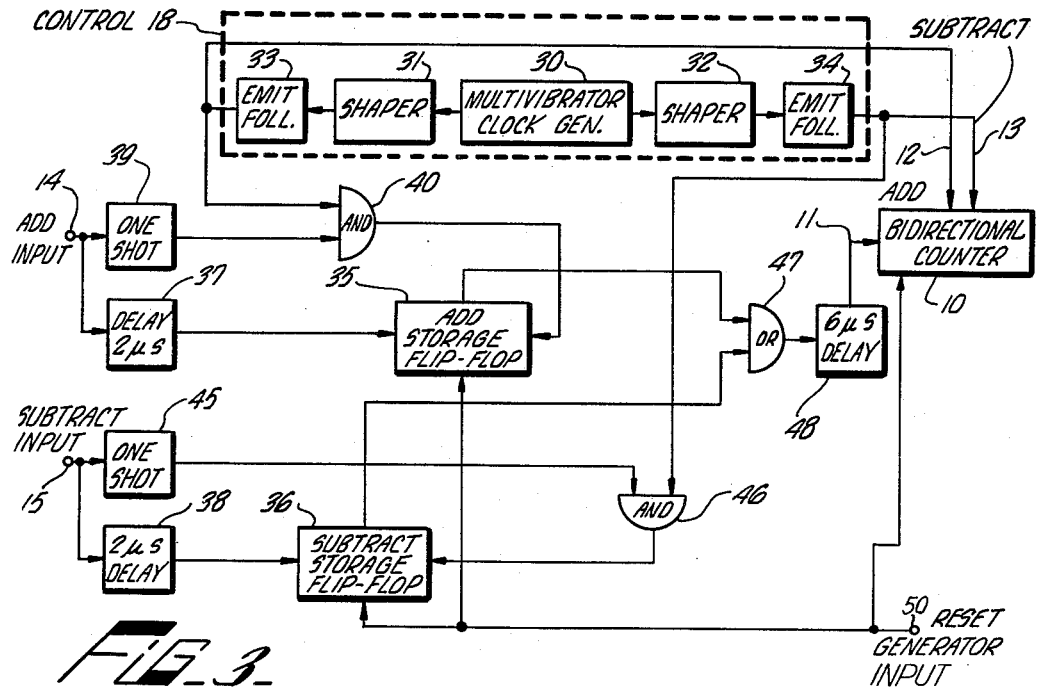
FIG. 3 is a detailed block diagram of a preferred embodiment of the invention shown in FIG. 1.

Referring now to FIG. 1, there is shown a simplified form of the invention including a bidirectional or reversible counter 10. A complete schematic for this type of counter is not shown and described herein since it is well known in the art, preferred counters of the decimal type being described in U.S. Patent 3,054,001—Hamilton C. Chisholm et al., and 3,054,060—Thomas H. Thomason, both of which are assigned to Beckman Instruments, Inc., assignee of the present invention. Such counters include one or more decades each having four binary counting units interconnected to selectively count in forward and backward directions. Both the forward and backward input signals are connected to an input terminal 11 and the counting mode is determined by pre-selected voltage levels introduced on ADD control line 12 and SUBTRACT control line 13. For a decimal counter, each decade is modified to count in a binary decimal mode. Thus, the lowest order decade records the value of the units decimal digit, the next highest decade records the value of the tens decimal digit, etc. A five decade counter may thus register any number between 0 and 99,999.

The ADD and SUBTRACT input terminals 14, 15 receive signals ordinarily in the form of pulses indicative of the occurrence of an event which is desired to be either added to or subtracted from previously occurring events. The ADD and SUBTRACT terminals 14, 15 are respectively connected to ADD storage 16 and SUBTRACT storage 17. These storage means are adapted to store signals which may occur simultaneously at terminals 14 and 15. Subsequently, the storage means are sequentially sampled by mutually exclusive clock pulses generated at respective outputs 12' and 13' of control 18. These outputs are also connected to the ADD and SUBTRACT control lines 12 and 13 for alternately driving the bidirectional counter 10 into its respective ADD and SUBTRACT counting modes. Each of the storage means, upon being sampled, transfers an output signal to the input of OR-gate 19 if a signal or pulse has been previously stored therein. Each of the pulses supplied to OR-gate 19 are supplied to the count input 11 of bidirectional counter 10. The sampling operation also serves to clear the storage means so that they can accept a succeeding input signal.

The operation of the counter shown in FIG. 1 is as follows: assume, for example, that the pulse signals shown in FIG. 2 are supplied to the ADD and SUBTRACT inputs 14 and 15 respectively. Thus, between times $T_1$ and $T_2$, pulse 20 is supplied to the input of ADD storage 16 which operates to store this pulse. A short time interval thereafter at time $T_2$, ADD storage 16 is supplied with a sampling input clock pulse 21 from control 18. As a result, the ADD storage is read and an input pulse 20' is supplied to bidirectional counter 11 via OR gate 19. At such time, the bidirectional counter is in the appropriate ADD counting mode because of an appropriate voltage level V supplied ADD control line 12 by control 18. Control 18 then changes (at time $T_3$) to its alternate state so as to set bidirectional counter 10 into its SUBTRACT counting mode. Counter 11 then switches to its reverse or SUBTRACT counting mode because of the application of the voltage level V to SUBTRACT control line 13. Also at time $T_3$, a clock pulse 22 generated by control 18 samples the SUBTRACT storage 17. However, in the example shown, it has been assumed that between the time $T_0$ and $T_3$, no input pulse is supplied SUBTRACT storage; accordingly, no pulse is transferred out of storage 17 into bidirectional counter 10 at time $T_3$.

Between times $T_5$ and $T_6$, it has been assumed in FIG. 2 that coincident or near coincident pulses 23 and 24 are supplied to ADD storage 16 and SUBTRACT storage 17 and respectively stored therein. At time $T_6$, the control 18 places bidirectional counter 10 in its ADD counting mode and the ADD storage 16 is sampled by clock pulse 25. A pulse 23' is then transferred to the bidirectional counter 11 causing the counter to add an additional input pulse. Control 18 subsequently switches to its opposite state at time $T_7$. Bidirectional counter 10 then switches to its SUBTRACT counting mode and pulse stored SUBTRACT 24' is sampled or read from SUBTRACT storage 17 by clock pulse 26 and is correctly subtracted by the bidirectional counter 10.

Between times $T_7$ and $T_{10}$, no input pulses are applied to terminals 14, 15. Accordingly, no pulse is transferred from the ADD storage into counter 10 at times $T_8$, $T_9$, and $T_{10}$ by clock pulses. Between times $T_{10}$ and $T_{11}$, input pulse 28 is received at the SUBTRACT input pulse 15. This pulse is read at time $T_{11}$ by clock pulse 29 at which time a pulse 28' is transferred to the counter input lead 11.

In the generalized system shown in FIG. 1, certain simplifying assumptions have been made for facilitating an understanding of the overall system operation. Thus, in the system shown, the storage means must be capable of storing an input pulse while simultaneously being sampled by the control means. This problem is avoided in the preferred detailed circuit schematic of FIG. 3 by gating off the clock pulses when an input ADD or SUBTRACT pulse is received.

Referring now to FIGURE 3, control 18 preferably comprises a free running multivibrator supplying alternating and mutually exclusive voltage levels to its respective outputs which are connected to wave shapers 31, 32 respectively. Emitter followers 33, 34 driven by respective ones of these shapers are respectively connected to the ADD and SUBTRACT control lines 12, 13 and provide the low impedance necessary to switch these reversing lines in the types of bidirectional counters described and claimed in U.S. Patents 3,054,001 and 3,054,060, supra. Clock pulses are also derived from the emitter follower outputs to sample ADD storage 35 and SUBTRACT storage 36 respectively. ADD storage 35 and SUBTRACT storage 36 may each be bistable flip-flop elements having a first or store input for triggering the bistable stage to its first stable state and a second or transfer input for triggering the stage to its second stable state. The store input of ADD storage flip-flop 35 is connected to ADD input terminal 14 via a pulse delay line 37. Similarly, the store input of SUBTRACT storage flip-flop 36 is connected to the SUBTRACT input terminal 15 via pulse delay line 38. Pulse delay lines 37 and 38 may be identically constructed in a manner well known in the art to provide a representative delay in the order of 2 microseconds. Their function in the system is described hereinafter.

ADD input terminal 14 is also connected to the trigger input of a one-shot multivibrator 39 which switches from its stable to its unstable state for a predetermined time interval, e.g. 4 microseconds in response to an input ADD pulse. During this interval, AND gate 40 coupled thereto is closed to inhibit the flow of clock pulses, i.e., the pulses cannot be transferred through the AND gate from the emitter follower 33 of control 18 to the transfer input of ADD storage flip-flop 35. Thus, any clock pulse which occurs coincident in time with an input ADD pulse is gated off so that it cannot interfere with storing the ADD pulse. The short delay provided by delay 37 insures that the AND gate 40 is closed when the input ADD pulse is applied to the store input of ADD storage flip-flop 35.

Similarly, one-shot multivibrator 45 is triggered by an input SUBTRACT pulse and closes AND gate 46 for a time interval long enough to allow the SUBTRACT input pulse to trigger the SUBTRACT storage flip-flop 36. This closed gate thus inhibits the flow of clock pulses from the output of emitter follower 34 to the SUBTRACT storage flip-flop 36 when this bistable element is being triggered by in input SUBTRACT pulse. Delay 38 functions in the manner of delay 37 and insures that AND gate 46 is closed (and the clock pulse, if any, interrupted) before an input SUBTRACT pulse is applied to the store trigger input of the SUBTRACT storage flip-flop 36.

Each of the storage flip-flop elements are provided with an output at which a pulse is applied when the respective flip-flop is triggered from its store stabe state to its transfer stable state, i.e. when the flip-flop is sampled subsequent to storing an input pulse. The outputs of both the ADD storage flip-flop 35 and SUBTRACT storage flip-flop 36 are connected as respective inputs of OR gate 47. A delay circuit 48 interconnects the output of this OR gate with the count input 11 of bidirectional counter 10. This delay provides enough time for the control 18 to reverse the counting mode of counter 10 before an input pulse is applied thereto. A representative time delay for this circuit is 6 microseconds.

A reset generator may be connected through an input terminal 50 to both of the storage flip-flops 35, 36 and the counter 10 for insuring that the storage elements are preset to receive store input pulses when the counter 10 is reset to zero.

Specific circuitry for each of the components shown in FIG. 3 has not been shown since details thereof are very well known to those skilled in the counter art. Many texts, for example, cover in some detail each of the electronic circuit components shown in this figure. See for example "Recurrent Electrical Transients" by L. W. Von Tersch and A. W. Swago published in 1953 by Prentice-Hall, Inc., New York. Also, the specific design for these circuits will depend upon the recurrence frequency of the input pulses. The maximum frequency at either of the input terminals 14, 15 is determined by the clock rate and the time for which the clock is inhibited by the one-shot multivibrator 39 or 45. This relationship may be expressed in the equation $$F_{max} = \frac{1}{\frac{1}{F_c} + T_I} \quad (1)$$

where $F_{max}$ is the maximum recurrent frequency of the input pulses, $F_c$ is the clock frequency, and $T_I$ is the inhibit time provided by the one-shot multivibrators. The clock frequency is determined by the counter propagation time (the maximum time required to correctly count each input pulse) and by the time required to change the counter from one mode to the other, or $$F_c = \frac{\frac{1}{2}}{T_p + T_d} \quad (2)$$

where $T_p$ is the counter propagation time and $T_d$ is the delay provided by delay 48 for allowing the counter to switch to its opposite counting mode.

Figure 4:
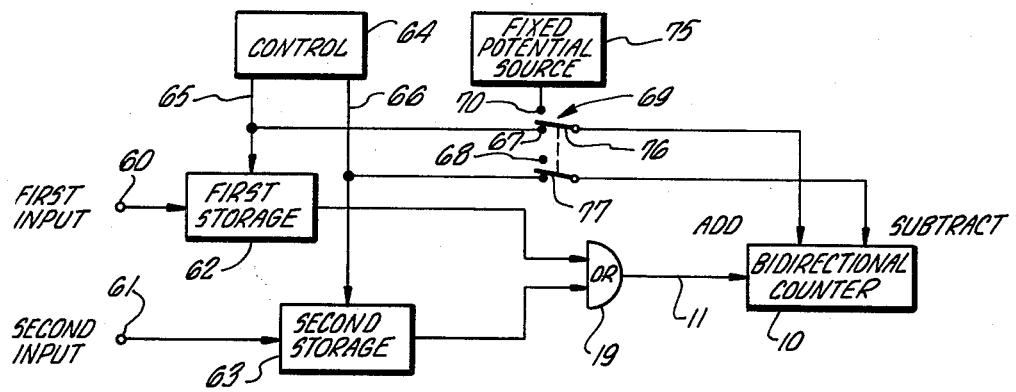
FIG. 4 is a simplified block diagram of a counter adapted to selectively add or subtract simultaneously occurring input signals.

FIGURE 4 illustrates counter apparatus adapted to selectively add or subtract simultaneously occurring input pulses. In order to facilitate understanding of this system, a simplified block diagram is shown. It will be understood that the gates and associated circuitry shown in FIG. 3 may be incorporated in this circuit. In the apparatus of FIG. 4, first and second input terminals 60, 61 are respectively connected to first and second storage means 62, 63. These storage means are alternately sampled by control 64 whose respective outputs 65, 66 are connected to the first and second storage means and to fixed switch contacts 67, 68 respectively of single-pole, double-throw switch 69. This switch includes also a fixed contact 70 connected to a fixed potential source 75 and movable contact arms 76, 77 respectively connected to the ADD and SUBTRACT control lines of bidirectional counter 10. The input 11 of the bidirectional counter 10 is connected to the outputs of the first and second storage means 62, 63 via OR gate 19 in the manner of FIG. 1.

The operation of the system of FIGURE 4 is as follows: When switch 69 is in the position shown, the bidirectional counter 10 will add input pulses applied to the first input terminal 60 and will substract input pulses applied to the second input terminal 61. Its operation in this mode is identical with that of the system shown in FIG. 1 and described hereinbefore. Actuation of switch 69 however disconnects the ADD and SUBTRACT control lines from the output 65, 66 of control 64 and instead connects the fixed potential source 75 to the ADD control line. Bidirectional counter 10 then remains in its ADD counting mode whereby pulses received from the output of OR gate 19 are continuously added regardless of whether they are received from the first input 60 or the second input 61. However, the sampling procedure is as described above whereby simultaneous input pulses may be applied to both storage means 60 and 61, these pulses being first stored and then read out by control 64 into the counter 10.

It will be apparent from the foregoing description that the present invention provides a reversible or bidirectional counter adapted to receive simultaneously occurring signals from a pair of single sources. Accordingly, the counter may be connected to sources of randomly occurring pulses without impairing the accuracy of the measured count.

Although exemplary embodiments of the invention have been disclosed and discussed, it will be understood that other applications of the invention are possible and that the embodiments disclosed my be subjected to various changes, modifications, and substitutions without necessarily departing from the spirit of the invention.

I claim:

1. Apparatus for adapting a bidirectional counter having a counting input to simultaneously accept two inputs representing opposite algebraic signs comprising:

means for generating mutually exclusive clock pulses at first and second outputs thereof, means connecting said clock pulse generator means to said bidirectional counter for alternately switching said counter to opposite counting modes, first and second bistable means each having a first input for triggering said bistable means to its first stable state, a second input for triggering said bistable means to its second stable state, and an output for providing an output pulse when said bistable means changes from its first to second stable state, means for connecting an ADD input terminal to the first input of said first bistable means, means for connecting a SUBTRACT input terminal to the first input of said second bistable means;

means for connecting the first and second outputs of said clock pulse generator means to respective second inputs of said first and second bistable means, and means for connecting the outputs of said first and second bistable means to the counting input of said bidirectional counter.

2. The apparatus defined in claim 1 comprising:

means for inhibiting the flow of clock pulses between said clock pulse generator means and said first bistable means in response to the receipt of a signal input at said ADD input terminal, and means for inhibiting the flow of clock pulses between said clock pulse generator means and said second bistable means in response to the receipt of a signal input at said SUBTRACT input terminal.

3. The apparatus defined in claim 2 wherein:

each of said means for inhibiting the flow of clock pulses comprises a normally open gate which is closed for a predetermined time interval in response to the receipt of a signal input at the associated input terminal.

4. The apparatus defined in claim 2 comprising:

means for delaying entry of input signals to said first and second bistable means to prevent entry of said input signals into said bistable means prior to the inhibition of said clock pulses.

5. The apparatus defined in claim 3 comprising:

means for delaying entry of input signals to said first and second bistable means until after the associated gate has closed.

6. The apparatus defined in claim 2 wherein each of said means for inhibiting the flow of clock pulses comprises:

a normally open gate, a one-shoe multivibrator which is triggered from its stable to its unstable state by a signal applied to the associated input terminal, and means connecting said one-shot multivibrator to the associated gate for closing said gate while said multivibrator is in its unstable state.

7. The apparatus defined in claim 1 wherein:

said means for connecting the outputs of said first and second bistable means to the counting input of said bidirectional counter includes a delay means for insuring that the counter is switched to its appropriate counting mode before an input pulse is applied thereto.

8. Apparatus for adapting a bidirectional counter having a counting input to simultaneously accept two inputs representing opposite algebraic signs comprising:

control means for alternately switching said bidirectional counter to opposite counting modes, first storage means for storing a first input signal representing a positive algebraic sign, second storage means for storing a second input signal representing a negative algebraic sign, means responsively connecting said first and second storage means to said control means for alternately reading (and clearing) said first and second storage means so that said first storage means is read and cleared when said bidirectional counter is in the mode corresponding to the algebraic sign of said first input signal and second storage means is read and cleared when said bidirectional counter is in the mode corresponding to the algebraic sign of said second input signal, and means responsively connecting the counting input of said bidirectional counter to said first and second storage means.

9. The apparatus defined in claim 8 comprising: means for delaying entry of said first and second input signals into said first and second storage means respectively.

10. Apparatus for adapting a bidirectional counter to simultaneously accept two inputs representing opposite algebraic signs, said counter having a counting input and counting mode control input, comprising:

control means having first and second outputs to which are applied alternating mutually exclusive control signals, said outputs being respectively connected to the counting mode control inputs of said bidirectional counter, first storage means for storing a first input signal representing a given algebraic sign, means responsive to the first output of said control means for reading (and clearing) said first storage means subsequent to the receipt of an input signal, second storage means for storing a second input signal representing the opposite algebraic sign, means responsive to the second output of said control means for reading (and clearing) said second storage means subsequent to the receipt of a second input signal so that said first storage means is read and cleared when said bidirectional counter is in the counting mode corresponding to the algebraic sign of said first input signal and said second storage means is read and cleared when said bidirectional counter is in the counting mode corresponding to the algebraic sign of said second input signal, and means responsively connecting the counting input of said bidirectional counter to said first and second storage means.

11. Apparatus for adapting a bidirectional counter having an input to simultaneously accept two inputs representing opposite algebraic signs comprising:

control means having a pair of outputs to which are alternately applied clock pulses, first and second triggerable storage means each having store and transfer inputs, and each having a store stable state and a transfer stable state provided by respective store and transfer input pulses thereto, means for connecting the store input of said first storage means to an ADD input terminal, means for connecting the store input of said second storage means to a SUBTRACT input terminal, gate means connecting one output of said control means to the transfer input of said ADD storage means, gate means connecting the other output of said control means to the transfer input of said SUBTRACT storage means, means for responsively connecting said first gate means to said ADD input terminal, means for responsively connecting said second gate means to said SUBTRACT input terminal, means for responsively connecting the input of said bidirectional counter to respond to the triggering of either of said storage means to its transfer stable state, and means for connecting said bidirectional counter to said control means so that it continuously alternates between its ADD and SUBTRACT counting modes.

12. Counting apparatus for selectively adding or subtracting signals applied to first and second input terminals comprising:

means for counting signals applied to a count input in selected forward and backward directions, control means adapted for continuously alternating said counting means between its forward and backward counting modes, means for selectively connecting said bidirectional counter to either said control means so that said counter alternately counts in forward and backward modes or to a fixed control signal so that said counter continuously counts in its forward counting mode, first storage means for storing input signals applied to said first input terminal, second storage means for storing input signals applied to said second input terminal, means connecting the first and second storage means to the count input of said counting means, and means connecting said first and second storage means to said control means so that said storage means are alternately sampled and the stored signals, if any, transferred to the count input of said counting means.

13. Counting apparatus for selectively adding or subtracting signals applied to first and second input terminals comprising:

means for generating mutually exclusive clock pulses at first and second outputs thereof;

a bidirectional counter having selected forward and backward counting modes for signals applied to a count input, said modes being determined by signals applied to respective forward and backward control lines;

means for selectively connecting (i) the forward and backward control lines of said counter to the first and second outputs respectively of said clock pulse generator means so that said counter alternately counts in forward and backward counting modes, or (ii) the forward control line of said counter to a fixed control signal so that said counter continuously counts in its forward direction;

first and second bistable means each having a first input for triggering said means to a store stable state, a second input for triggering said means to a transfer stable state, and an output for providing an output pulse when said means changes from its store to its transfer stable state;

means for connecting said first input terminal to the first input of said first bistable means;

means for connecting said second input terminal to the first input of said second bistable means, means for connecting the first and second outputs of said clock pulse generator means to a respective second input of said first and second bistable means, and means for connecting the outputs of said first and second bistable means to the count input of said bidirectional counter.

14. Counting apparatus for accurately subtracting signals applied to a SUBTRACT input terminal from signals occurring in possible time coincidence at an ADD input terminal, said apparatus comprising:

a bidirectional counter means having an input for alternately adding or subtracting signals applied thereto, first means connected between said ADD input terminal and the input of said bidirectional counter for storing signals applied to said ADD input terminal and subsequently transferring said signals to the input of said bidirectional counter when said counter is in its ADD counting mode, second means connected between said SUBTRACT input terminal and the input of said bidirectional counter for storing signals applied to said SUBTRACT input terminal and subsequently transferring said signals to the input of said bidirectional counter when said counter is in its SUBTRACT counting mode, and means connected to said counter and to said first and second means for controlling the respective operations thereof.

References Cited by the Examiner
UNITED STATES PATENTS

| | | | |
|---|---|---|---|
| 2,867,724 | 1/59 | Olson | 328—44 X |
| 3,028,084 | 4/62 | Weatherill | 235—92 |

ARTHUR GAUSS, *Primary Examiner*.